United States Patent [19]

Wilkinson et al.

[11] Patent Number: 4,656,514

[45] Date of Patent: Apr. 7, 1987

[54] ERROR CONCEALMENT IN DIGITAL TELEVISION SIGNALS

[75] Inventors: James H. Wilkinson; John G. S. Ive, both of Basingstoke, United Kingdom; Peter C. Boreland, Waterbury, Conn.

[73] Assignee: Sony Corporation, Tokyo, Japan

[21] Appl. No.: 767,646

[22] Filed: Aug. 20, 1985

[30] Foreign Application Priority Data

Aug. 21, 1984 [GB] United Kingdom ............... 8421170

[51] Int. Cl.$^4$ ............................................. H04N 5/14
[52] U.S. Cl. .................................... 358/160; 358/167
[58] Field of Search ............... 358/160, 163, 336, 314, 358/166, 167, 21 R, 36, 37, 105; 382/52; 371/31, 65

[56] References Cited

U.S. PATENT DOCUMENTS

| | | | |
|---|---|---|---|
| 4,240,109 | 12/1980 | Michael et al. | 358/105 |
| 4,288,815 | 9/1981 | Miles | 358/105 |
| 4,296,436 | 10/1981 | Achiha | 358/105 |
| 4,329,708 | 5/1982 | Yamamoto et al. | 358/36 |
| 4,403,250 | 9/1983 | Kellar | 358/105 |
| 4,586,082 | 4/1986 | Wilkinson | 358/160 |

Primary Examiner—Tommy P. Chin
Assistant Examiner—David E. Harvey
Attorney, Agent, or Firm—Lewis H. Eslinger; Alvin Sinderbrand

[57] ABSTRACT

Apparatus for concealing errors in a digital television signal comprises delay elements for deriving a current sample value and a first group of the sample values spatially closest to the current sample value in the same frame of the television signal and delay elements for deriving from the preceding frame of the television signal a delayed sample value corresponding in position to the current sample value and a second group of sample values respectively corresponding in position to the sample values. The current sample value and the delayed sample value are checked for error, and subtractors check pairs of sample values corresponding in position in the current and preceding frames of the television signal for error, derive a measure of the difference in the levels of the sample values in each pair, and combine the results of these checks to provide an output signal which is a measure of the number of the errors and of the sum of the differences. A threshold device checks the output signal against a predetermined threshold level corresponding to an acceptably small number of errors and a relative low degree of movement in the part of a television picture corresponding to the groups of sample values, and a selector is operative, if the sample value is in error, the delayed sample value in not in error, and the output signal is below the predetermined level, to replace the current sample value by the delayed sample value for supply to an output, and, in all other cases, to supply the current sample value to the output.

10 Claims, 3 Drawing Figures

ERROR CONCEALMENT IN DIGITAL TELEVISION SIGNALS

BACKGROUND OF THE INVENTION

1. Field of the Invention

This invention relates to methods of and apparatus for concealing errors in digital television signals.

2. Description of the Prior Art

In a digital video tape recorder (DVTR), an incoming television signal to be recorded is sampled, the samples are pulse code modulation coded into digital form, the resulting digital data signals are recorded on a magnetic tape and subsequently reproduced, the reproduced digital data signals are decoded, and the decoded signals are used to form an analog signal corresponding to the original television signal. If errors occur in the handling of the digital signals, for example due to noise or tape drop-out occurring in the DVTR, the reproduced digital signals are corrupted and then the re-formed analog television signal does not correspond exactly to the original analog television signal, and a resulting television picture is degraded.

Errors are particularly liable to occur when the DVTR is operating in a special reproduction mode, that is to say in one of the modes which include still, slow motion, reverse motion and the so-called shuttle mode which comprises the whole range of speeds from fast forward to fast reverse.

Such errors and their detrimental effects can be reduced by correction and concealment. Correction involves the production and use of additional data signals purely for the purposes of error detection and correction, these additional data signals otherwise being redundant. While correction provides good results, it cannot generally be used as the sole means of dealing with errors, because a comprehensive error correction capability would require an excessive amount of additional data which might overload the data handling paths or raise data rate to an unacceptable level. Concealment comprises the replacement of corrupted data signals by available uncorrupted data signals and by data signals generated using available uncorrupted data signals. Concealment relies largely for accuracy on the strong correlation that exists in a television signal.

In concealment, the data signal which is used for replacement of a corrupted data signal can be derived spatially or temporally. Spatial concealment involves the generation of a sample value to replace a sample value which the earlier-applied error correction process has failed to correct, by using available sample values in the same field or frame as the error sample value. To give a very simple example, a concealment sample value can be generated by averaging the two adjacent sample values in the same horizontal scan line. Commonly, however, more sophisticated methods of generating concealment sample values are used, and one such method is disclosed in our UK Pat. No. 2 084 432. Temporal replacement involves the replacement of an error sample value by the sample value from the corresponding sample position in the preceding frame.

Both spatial concealment and temporal replacement have their advantages and disadvantages. Because usually there is little movement in a television picture from frame to frame, temporal replacement more usually gives a better result. However, when movement occurs in the picture, temporal replacement results in a form of picture degradation known as trailing dots, which occur at sample positions in the picture where temporal replacement has been used and hence the picture information has not been updated. Where movement occurs in the picture, and most particularly where there is a lot of movement, such as occurs for example when a television camera is being panned, spatial concealment gives a better dynamic response and hence a picture which is much more acceptable to the human eye. With spatial concealment, however, the overall quality of the picture is reduced.

SUMMARY OF THE INVENTION

One object of the present invention is to provide a method of concealing errors in a digital television signal in which the problem of trailing dots is reduced.

Another object of the present invention is to provide a method of concealing errors in a digital television signal in which a decision is made in dependence on the picture and error content whether or not to effect temporal error concealment.

Another object of the present invention is to provide apparatus for concealing errors in a digital television signal and comprising means to analyse the movement and error content in the picture to determine whether or not to effect temporal error concealment.

According to the present invention there is provided a method of concealing errors in a digital television signal, the method comprising the steps of:

deriving a current sample value and a first group of sample values located spatially close to said current sample value in the same frame of said television signal;

deriving from the preceding frame of said television signal a delayed sample value corresponding in position to said current sample value, and a second group of sample values respectively corresponding in position to the sample values of said first group of sample values;

checking said current sample value for error;

checking said delayed sample value for error;

checking pairs of sample values from said first and second groups of sample values and corresponding in position in said current and preceding frames of said television signal for errors and to derive a measure of the difference in the levels of the two sample values in each said pair, combining the results of these checks to provide an output signal which is a measure of the number of said errors and of the sum of said differences;

checking said output signal against a predetermined threshold level corresponding to an acceptably small number of errors and a relatively low degree of movement in the part of a television picture corresponding to said groups of sample values; and if said current sample value is in error, said delayed sample value is not in error and said output signal is below said predetermined threshold level, replacing said current sample value by said delayed sample value for supply to an output, and, in all other cases, supplying said current sample value to said output.

According to the present invention there is also provided apparatus for concealing errors in a digital television signal, the apparatus comprising:

first delay means for deriving a current sample value and a first group of sample values located spatially close to said current sample value in the same frame of said television signal;

second delay means for deriving from the preceding frame of said television signal a delayed sample value corresponding in position to said current sample value, and a second group of sample values respectively corresponding in position to the sample values of said first group of sample values;

means for checking said current sample value for error;

means for checking said delayed sample value for error;

means for checking pairs of sample values from said first and second groups of sample values and corresponding in position in said current and preceding frames of said television signal for errors and for deriving a measure of the difference in the levels of the two sample values in each said pair, and for combining the results of these checks to provide an output signal which is a measure of the number of said errors and of the sum of said differences;

threshold means for checking said output signal against a predetermined threshold level corresponding to an acceptably small number of errors and a relatively low degree of movement in the part of a television picture corresponding to said groups of sample values; and a selector operative, if said sample value is in error, said delayed sample value is not in error and said output signal is below said predetermined threshold level, for replacing said current sample value by said delayed sample value for supply to an output, and, in all other cases, for supplying said current sample value to said output.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
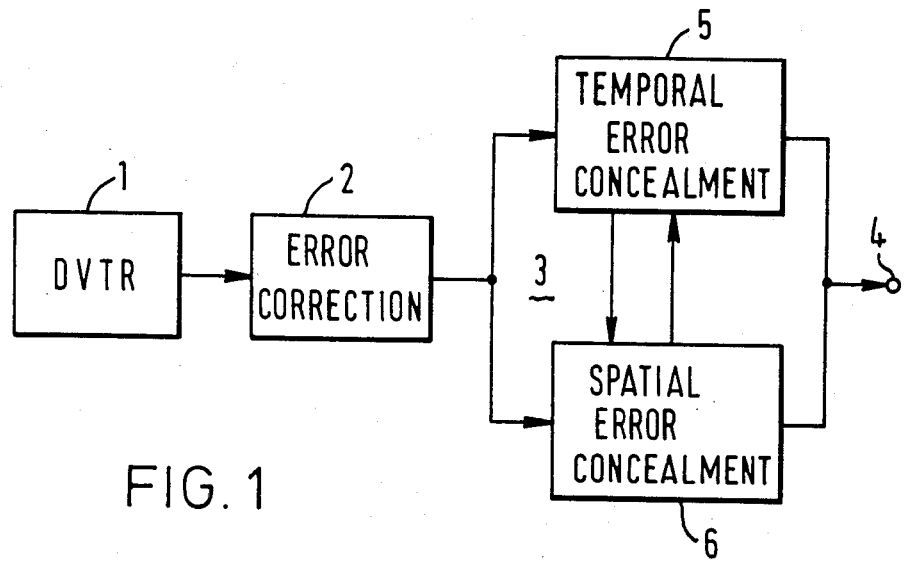
FIG. 1 is a very much simplified block diagram of a digital television reproducing apparatus.

Referring first to FIG. 1, reproducing apparatus for a digital television signal recorded on a magnetic tape comprises a DVTR 1, an error correction arrangement 2, an error concealment arrangement 3, and an output terminal 4 to which the reproduced digital television signal is supplied after error correction and concealment. The error concealment arrangement 3 comprises a temporal error concealment arrangement 5 and a spatial error concealment arrangement 6. The error correction arrangement 2 operates in known manner to effect error correction so far as possible on 8-bit digital data words reproduced by the DVTR 1 from the tape and representing successive sample values of the television signal. Each of the output data words supplied by the error correction arrangement 2 has associated with it an additional bit forming an error flag which is set to a predetermined one of the two possible values if the data word still has an error, and is otherwise set to the other value. The sample values corresponding to the data words flagged as being in error are concealed by the error concealment arrangement 3.

As discussed above, temporal replacement generally gives a better result, in particular for the sample values corresponding to those parts of the corresponding television picture, which may amount to the whole of the corresponding television picture, where there is little or no movement. However, where there is significant movement, spatial concealment gives a better dynamic response, which is generally more visually acceptable. The temporal error concealment arrangement 5 therefore operates not only to affect temporal replacement, but also to judge sample value by sample value, whether temporal replacement is appropriate. If it is not appropriate, then spatial error concealment, effected by the spatial error concealment arrangement 6 is next selected. However, there will be situations, in particular where there is a very high error rate such as may arise in special reproduction modes such as the shuttle mode, where there are simply not enough valid sample values available for any form of spatial error concealment to give a satisfactory result. In such cases, temporal concealment is reverted to as the final option, as a temporally incorrect sample value, even although it may give rise to a trailing dot, is more acceptable in the reproduced picture than a totally erroneous sample value.

The present invention is particularly concerned with the form and operation of the temporal error concealment arrangement 5, and more particularly with the way in which the primary decision is made whether to conceal an error samaple value temporally or spatially.

Figure 2:
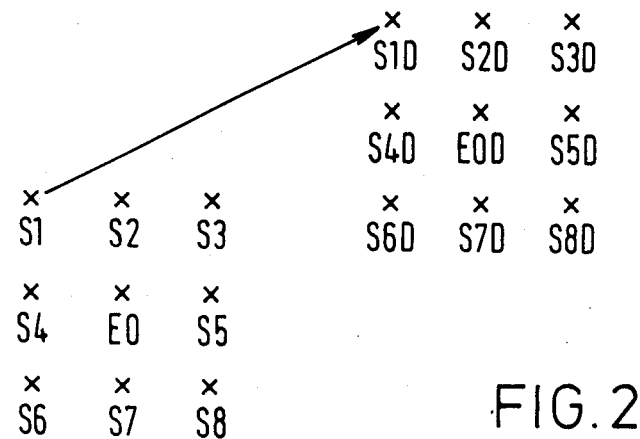
FIG. 2 shows sample arrays in corresponding positions in two successive frames of a television picture.

Referring to FIG. 2, this shows an array of nine luminance sample positions in a frame, the sample positions comprising a central sample position which is the current sample position under examination and where an error sample value E0 may exist, and the eight most closely adjacent sample positions, three in the preceding horizontal scan line, the two adjacent ones in the same horizontal scan line, and three in the succeeding horizontal scan line. The sample values at these eight sample positions will be referred to as S1 to S8, respectively. FIG. 2 also shows the nine corresponding luminance sample positions in the preceding frame. The sample values in these sample positions are made available by delaying the preceding frame by one frame period, and hence the sample value in the central position is referenced E0D, and the other eight sample values will be referred to as S1D to S8D, respectively.

Figure 3:
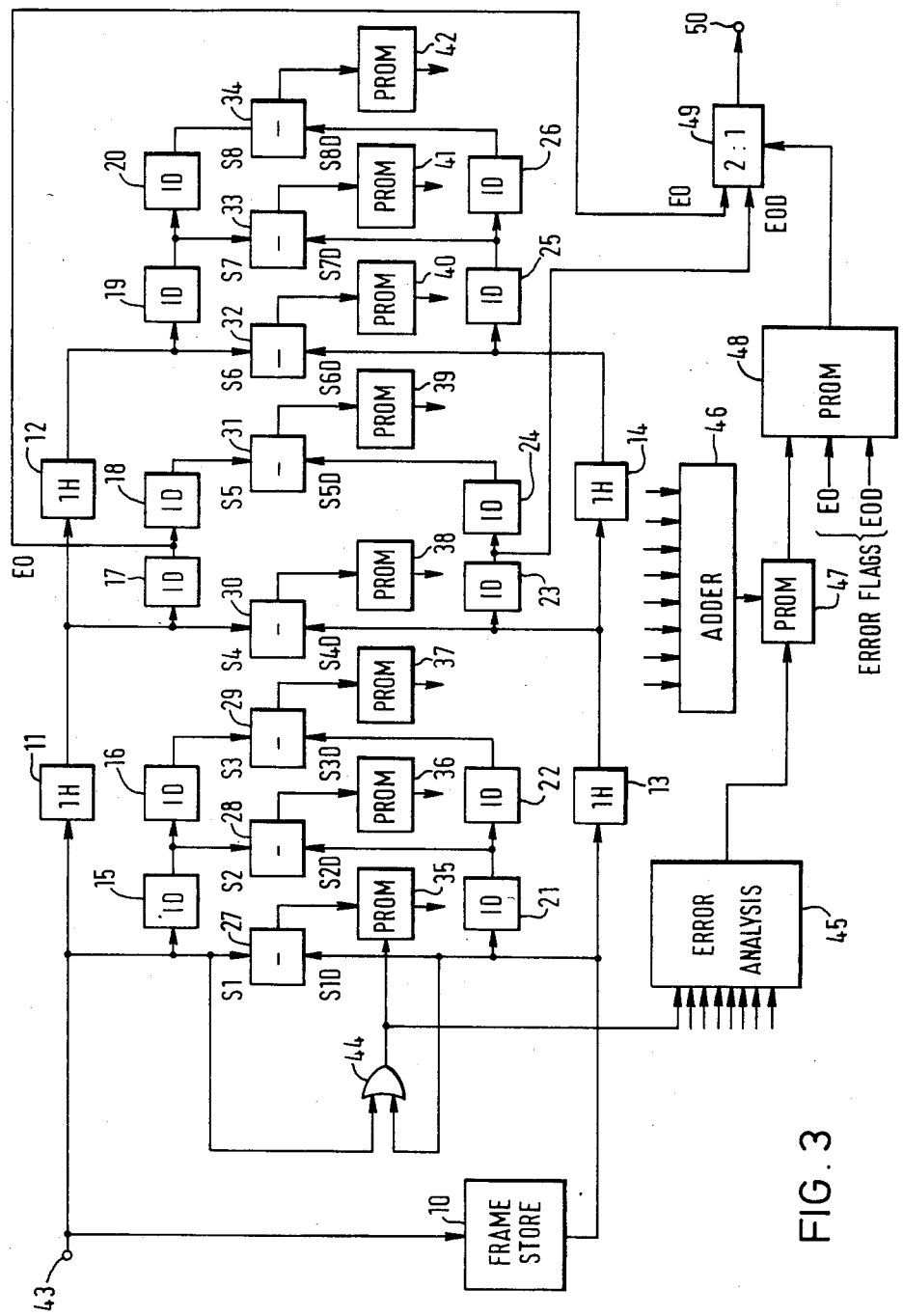
FIG. 3 shows in more detailed block diagrammatic form part of the apparatus of FIG. 1.

FIG. 3, to which reference is now made, shows part of the temporal error concealment arrangement 5 of FIG. 1 in more detail. In order to make the primary decision whether to use temporal or spatial concealment, the sample values S1 to S8 and E0 in the nine sample positions of FIG. 2, together with the sample values S1D to S8D and E0D in the corresponding sample positions in the preceding frame, have to be made available sample position by sample position for each data word received from the error correction arrangement 2 of FIG. 1.

This is done by a frame store 10 which causes a delay of one frame period, four line delays 11 to 14 each of which causes a delay of one horizontal scan line period, and twelve sample delays 15 to 26, each of which causes a delay of one sample period. Using the notation of FIG. 2, the delay elements 10 to 26 together make available the eighteen sample values E0, E0D, S1 to S2 and S1D of FIG. 2 at the points in the circuit indicated in FIG. 3.

In order to decide whether temporal replacement is appropriate, the sample values S1 to S8 in each of the eight sample positions nearest to the current sample position are compared in value with the corresponding sample values S1D to S8D from the preceding frame to obtain a measure of the difference in their levels. This in effect a way of obtaining a measure of the degree of movement in the picture from frame to frame. To obtain this measure, the sample values S1 to S8 and S1D to S8D are supplied in corresponding pairs to eight subtractors 27 to 34. Thus, the subtractor 27, for example, receives the sample values S1 and S1D and supplies an output corresponding to their difference in level to a threshold programmable read-only memory (PROM) 35. Likewise the subtractors 28 to 34 supply outputs corresponding to the differences in the levels of the sample values respectively applied to them, to respective threshold PROMs 36 to 42.

Each of the threshold PROMs 35 to 42 operates to supply a scaled output representing the signal supplied thereto by the corresponding subtractor 27 to 34, and as the signal supplied to each of the threshold PROMs 35 to 42 increases, the quantization becomes coarser. In other words, this scaling is effected so that outputs from the subtractors 27 to 34 representing small differences in the two sample values supplied to the respective subtractors 27 to 34 result in small scaled outputs from the threshold PROMs 36 to 42, but as the difference in the two sample values increase, the scaled outputs from the threshold PROMs 36 to 42 increase more slowly.

It will be recalled that each of the input data words which are supplied by way of an input 43 comprises eight data bits and a ninth bit which forms an error flag and which has been added by the error correction arrangement 2 (FIG. 1). Considering only the threshold PROM 35 for the moment, the error flags associated with the data words representing the sample values S1 and S1D supplied to the subtractor 37 are derived by an OR-gate 44. If either or both of the error flags is set to indicate that the corresponding sample value S1 or S1D is in error, the OR-gate 44 supplies an error output to the threshold PROM 35 and also to one of eight inputs of an error analysis PROM 45. If the threshold PROM 35 receives such an error output from the OR-gate 45, the output of the threshold PROM 35 is forced to zero, independent of the difference value supplied to the threshold PROM 35 by the subtractor 27. Although for simplicity they are not shown in FIG. 3, each of the threshold PROMs 36 to 42 likewise has an associated OR-gate corresponding to the OR-gate 45 and operating in like manner in dependence on the error flags associated with the sample values supplied to the respective subtractors 28 to 34. Thus, if any of the sample values S1 to S8 and S1D to S8D are in error, the output of the appropriate threshold PROM 35 to 42 is forced to zero and moreover an error output is supplied to the corresponding input of the error analysis PROM 45.

The outputs of each of the threshold PROMs 35 to 42 are connected to an adder 46 which adds the values of the eight inputs received and supplies an output to a scaling PROM 47, which also receives an input from the error analysis PROM 45. The scaling PROM 47 operates to give an overall measure of the advisability of using temporal replacement for concealment. Thus, if for example there were no movement in the picture and no errors in any of the samples S1 to S8 and S1D to S8D, the output of the adder 46 would correspond to zero and there would be no error output from the error analysis PROM 45. However, if there were movement in the picture, then the output of the adder 46 would correspond to some value greater than zero. Likewise, where errors are present, so that the error analysis PROM 45 is supplying an output to the scaling PROM 47, the operation of the scaling PROM 47 is such as effectively to increase any value which is being received from the adder 46. This operation is such that the scaling PROM 47 supplies its maximum output when the error analysis PROM 45 is receiving eight input error signals, even although in that case the output of the adder 46 is zero, because the output of each of the threshold PROMs 35 to 42 has been forced to zero.

The output of the scaling PROM 47 is supplied to a further threshold PROM 48. The further threshold PROM 48 also receives as inputs the error flag corresponding to the sample value E0 at the current sample position and the error flag corresponding to the delayed sample value E0D from the corresponding sample position in the preceding frame. The decision whether to substitute the delayed sample value E0D for the sample value E0 is made by the further threshold PROM 48. In other words, the threshold PROM 48 makes the primary decision whether to effect temporal replacement for concealment at the current sample position or not. This decision is based on three factors. Firstly, the error flag for the sample value E0 must indicate that it is in error, because if it does not then no concealment, whether temporal or spatial, is necessary. Secondly, the error flag corresponding to the delayed sample value E0D must indicate that it is error free, because if it is in error then it is not desired to use the erroneous delayed sample value E0D as a replacement. Thirdly, the output value supplied by the scaling PROM 47 must be below a predetermined threshold value which is chosen to correspond to a reasonably low level of movement and of sample values in error in that part of the television picture corresponding to the eight sample positions surrounding the current sample position. Where all three of these conditions are satisfied, the further threshold PROM 48 supplies an output to a 2:1 selector 49 to indicate that replacement is to take place, whereupon the selector 49 switches to supply the delayed sample value E0D to an output 50. At all other times the sample value E0 is supplied by the selector 49 to the output 50.

Referring again to FIG. 1, the overall operation is therefore such that if the current sample value is not flagged as being in error, it is passed to the output terminal 4. If the current sample value is flagged as being in error, and if the primary decision of the temporal error concealment arrangement 5 is that temporal replacement should take place, then in place of the current sample the correspondingly positioned sample value E0D delayed by one frame is supplied to the output terminal 4. If, however, the temporal error concealment arrangement 5 decides that although the current sample value E0 is in error, temporal replacement is not appropriate, because of the number of errors in the immediately adjacent sample values and/or because movement in the picture is causing substantial changes in the sample values in corresponding positions from frame to frame, then the decision passes to the spatial error concealment arrangement 6.

The spatial error concealment arrangement 6 can take any one of a number of different known forms, for example that disclosed in our UK Pat. No. 2 084 432 referred to above. However, it is preferred that the spatial error concealment arrangement 6 combines several known methods of spatial concealment, and works through these methods in sequence to select the one most appropriate to the given current picture content and error situation. The preferred sequence is as follows:

1. Spatial concealment, the concealment being adaptive by picture analysis.
2. Spatial concealment, the concealment being adaptive by error analysis.
3. Spatial replacement, the replacement being adaptively steered using spatial and error analysis.

All these methods are known, but an example of each method will be briefly described. Firstly, spatial concealment where the concealment is adaptive by picture analysis may comprise generating a concealment sample value by averaging the two or more sample values most closely adjacent to the current sample value in any one of the available four directions, that is the horizontal, the vertical and the positive and negative diagonal directions, in the same field or frame. This averaging in the four directions is done continuously to maintain a current indication of which direction of averaging is giving the best results, and when the current sample value is flagged as being in error, and the primary decision is not to effect temporal replacement, spatial concealment is effected using the direction currently indicated as giving the best result.

Secondly, spatial concealment where the concealment is adaptive by error analysis may comprise generating a concealment sample value by averaging the two or more sample values most closely adjacent to the current sample value in any one of the available four directions, that is the horizontal, the vertical and the positive and negative diagonal directions, in the same field or frame. This averaging in the four directions is done continuously to maintain a current indication of which direction of averaging involves the use of the fewest sample values flagged as being in error. When two directions both involve the use of the lowest number of sample values which are in error, then the direction using the spatially nearest sample values, which will generally be the horizontal direction, is indicated as giving the best result. Then, when the current sample value is flagged as being in error, and the primary decision is not to effect temporal replacement, spatial concealment is effected using the direction currently indicated as giving the best result.

Thirdly, spatial replacement where the replacement is adaptively steered using spatial and error analysis may comprise generating a replacement value simply by taking the sample value most closely adjacent to the current sample value in any one of the available eight directions in the same field or frame. This replacement from the eight directions is tested continuously to maintain a current indication of which direction is giving the best result, both in terms of not using sample values which are flagged as being in error and in terms of resulting in the selection of a replacement sample value closest in level to the current sample value. Then, when the current sample value is flagged as being in error, the primary decision is not to effect temporal replacement, and error concealment by adaptive steering is not possible, spatial replacement is effected using the direction currently indicated as giving the best result.

The spatial error concealment arrangement 6 sets a threshold level for each of these methods of spatial replacement, and if none of the methods taken in sequence reaches the predetermined threshold level and hence is likely to result in satisfactory spatial concealment, then the spatial error concealment arrangement 6 supplies an output to the temporal error concealment arrangement 5, and the temporal error concealment arrangement 5 is operative to replace the error sample value E0 with the delayed sample value E0D. It is recognized that this will give rise to a temporally incorrect sample value, and hence may well result in a trailing dot in the reproduced picture, but this is probably more acceptable than leaving the error sample value E0 or replacing it with some other erroneous sample value derived spatially.

The foregoing sequence of steps is used to decide upon the form of replacement to be used when the DVTR 1 is operating in the normal playback mode and in still and slow motion modes. However, when the DVTR 1 is operating in the shuttle mode, the reproduced data is so imperfect and relates to parts of so many frames compressed in time, that the primary step of temporal concealment is omitted. In the shuttle mode, therefore, the sequence becomes spatial concealment, the concealment being adaptive by picture analysis; spatial concealment, the concealment being adaptive by error analysis; spatial replacement, the replacement being adaptively steered using spatial and error analysis; and, finally, temporal replacement.

In the foregoing description it has been assumed that the selection of the method of replacement to be used is done using the luminance sample values. It is additionally possible to effect the same method for the chrominance sample values in a composite digital television signal, but as it is usually the case that a change in the luminance sample values is accompanied by a corresponding change in the chrominance sample values, it is simpler to effect concealment of the chrominance sample values using the method selected in dependence on the examination of the luminance sample values.

Various modifications are of course possible, and in particular the operations performed by the elements 27 to 48 of FIG. 3 can be embodied in different forms without departing from the scope of the invention as defined in the broadest of the appended claims.

We claim:

1. A method of concealing errors in a digital television signal organized in a succession of frames, the method comprising the steps of:

deriving a current sample value of a current sample and a first group of sample values of a first group of samples located spatially close to said current sample in one of said frames of said television signal;

deriving from a preceding one of said frames of said television signal a delayed sample value of a delayed sample corresponding in position to said current sample, and a second group of sample values of a second group of samples respectively corresponding in position to the samples of said first group of samples;

effecting a check of said current sample value for error;

effecting a check of said delayed sample value for error;

effecting checks of pairs of sample values respectively paired from said first and second groups of samples for errors and deriving a measure of a difference in levels between the two sample values in each of said pairs;

providing, in response to said checks, an output signal which is a measure of the number of said errors and of the sum of said differences;

checking said output signal against a predetermined threshold level; and if said current sample value is in error, said delayed sample value is not in error and said output signal is below said predetermined threshold level, replacing said current sample value by said delayed sample value for supply to an output, and, if said current samples values is not in error, supplying said current sample value to said output.

2. A method according to claim 1 comprising the further step of replacing said current sample value by a spatially derived replacement sample value if said current sample value is in error and the preceding steps have not resulted in the replacement of said current sample value by said delayed sample value.

3. Apparatus for concealing errors in a digital television signal organized in a succession of frames, the apparatus comprising:

first delay means for deriving a current sample value of a current sample and a first group of sample values of a first group of samples located spatially close to said current sample in one of said frames of said television signal;

second delay means for deriving from a preceding one of said frames of said television signal a delayed sample value of a delayed sample corresponding in position to said current sample, and a second group of sample values of a second group of samples respectively corresponding in position to the samples of said first group of samples;

means for effecting a check of said current sample value for error;

means for effecting a check of said delayed sample value for error;

means for effecting checks of pairs of sample values respectively paired from said first and second groups of samples for errors and for deriving a measure of a difference in levels between the two sample values in each of said pairs to provide an output signal which is a measure of the number of said errors and of the sum of said differences;

threshold means for checking said output signal against a predetermined threshold level; and a selector operative, if said sample value is in error, said delayed sample value is not in error and said output signal is below said predetermined threshold level, for replacing said current sample value by said delayed sample value for supply to an output, and, if said current sample value is not in error, for supplying said current sample value to said output.

4. Apparatus according to claim 3 wherein said first and second groups of sample values comprise eight sample values located spatially nearest to said current sample value and said delayed sample value, respectively, and said first delay means comprises two one horizontal scan line delay elements and six sample period delay elements for deriving said current sample value and said first group of sample values.

5. Apparatus according to claim 4 wherein said second delay means comprises a frame store, two one horizontal line scan delay elements and six sample period delay elements for deriving said delayed sample value and said second group of sample values.

6. Apparatus according to claim 5 wherein said means for checking said pairs of sample values comprises subtractor means for deriving the measure of the difference in the levels between said sample values in each of said pairs.

7. Apparatus according to claim 6 wherein said subtractor means scales said measure of the difference so that as said difference becomes greater said measure of the difference is quantized more coarsely.

8. Apparatus according to claim 7 wherein results of said checks are combined to derive said output signal by a programmable read-only memory to which is also supplied a signal derived from error flag bits associated with data words representing said sample values in said first and second groups of sample values.

9. Apparatus according to claim 3 further comprising means to replace said current sample value by a spatially derived sample value if said current sample value is in error and has not been replaced by said delayed sample value by said selector.

10. Apparatus according to claim 9 wherein said means to replace said current sample value by a spatially derived sample value selects between spatial concealment where the concealment is adaptive by picture content, spatial concealment where the concealment is adaptive by error analysis, and spatial replacement where the replacement is adaptively steered using spatial analysis and said error analysis.

* * * * *